W. L. HENDRICKS.
BUTTER FOR GRAIN BINDERS.
APPLICATION FILED MAR. 15, 1916.

1,285,166.

Patented Nov. 19, 1918.
3 SHEETS—SHEET 1.

Inventor
Walter L. Hendricks
Gillson & Gillson
Attorneys

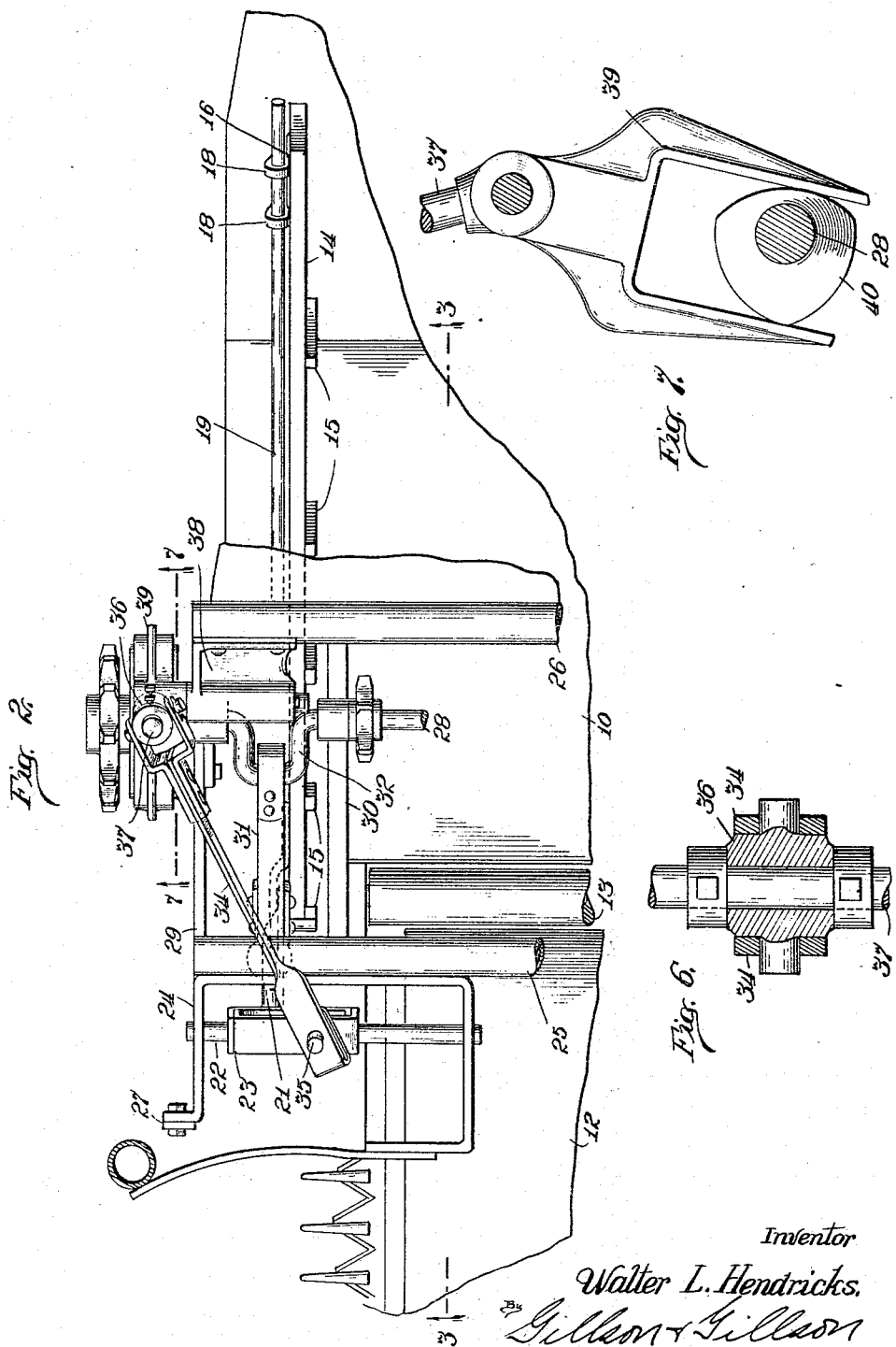

W. L. HENDRICKS.
BUTTER FOR GRAIN BINDERS.
APPLICATION FILED MAR. 15, 1916.
1,285,166.
Patented Nov. 19, 1918.
3 SHEETS—SHEET 3.
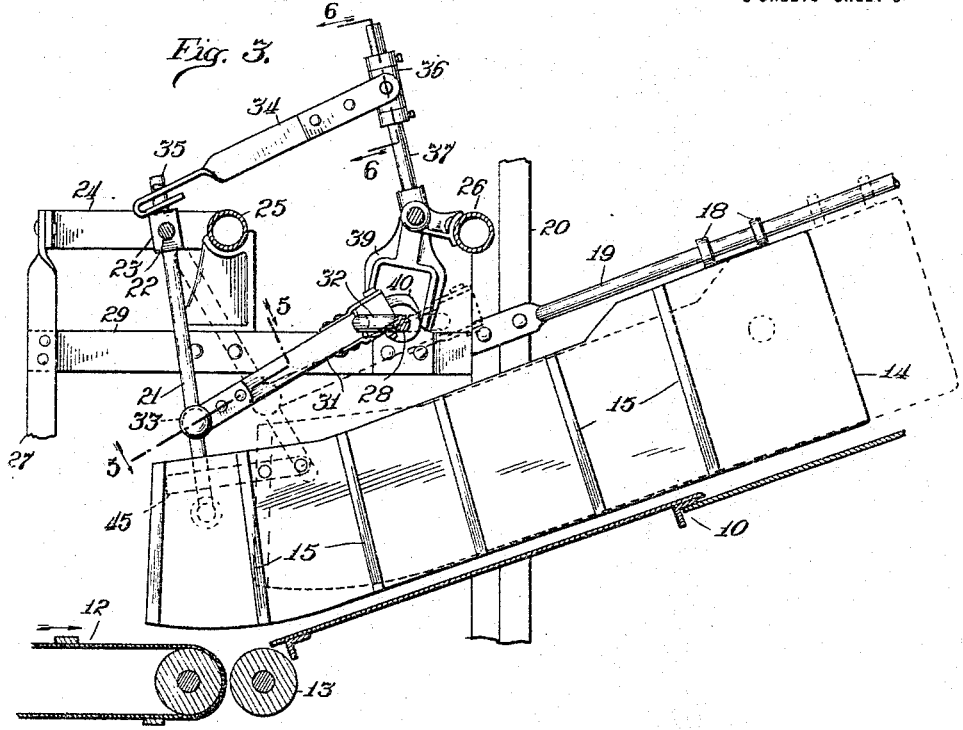
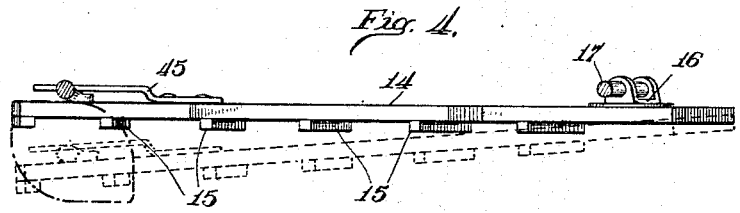
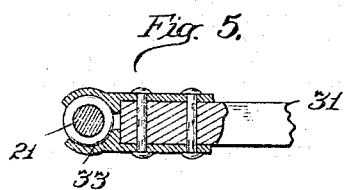
Inventor
Walter L. Hendricks
By Gillson & Gillson
Attorneys

UNITED STATES PATENT OFFICE.

WALTER L. HENDRICKS, OF AURORA, ILLINOIS.

BUTTER FOR GRAIN-BINDERS.

1,285,166.

Specification of Letters Patent.

Patented Nov. 19, 1918.

Application filed March 15, 1916. Serial No. 222,986.

*To all whom it may concern:*

Be it known that I, WALTER L. HENDRICKS, a citizen of the United States, and resident of Aurora, county of Kane, and State of Illinois, have invented certain new and useful Improvements in Butters for Grain-Binders, of which the following is a specification and which are illustrated in the accompanying drawings, forming a part thereof.

The invention relates to harvesting machines and more particularly to reapers and binders, the object of the invention being the provision of improved means for jogging the grain during its delivery to the bundle forming mechanism to insure the formation of bundles with even ends. The invention accordingly proposes the use of a butter board and improved mechanism for operating the same whereby the board is moved in a path contemplated to render it especially effective in arranging the loose grain with the ends of the stalks in a common plane without in anywise interfering with the delivery of the grain to the binder mechanism.

In the accompanying drawings;—

Fig. 2 is a detail plan view of the machine, the reel standard being shown in section;

Fig. 3 is a detail transverse sectional view of the machine, looking forwardly, the sectional plane being indicated by the line 3—3 on Fig. 2;

Fig. 4 is a detail plan view showing the butter board and its connecting elements, separated from other parts, the connecting elements being shown in section, path of movement of one part of the board being represented in diagram and a second position of the board being indicated by dotted lines;

Fig. 5 is a detail sectional view taken on the line 5—5 of Fig. 3;

Fig. 6 is a detail sectional view taken on the line 6—6 of Fig. 3; and

Fig. 7 is a detail sectional view taken on the line 7—7 of Fig. 2.

Figure 1:
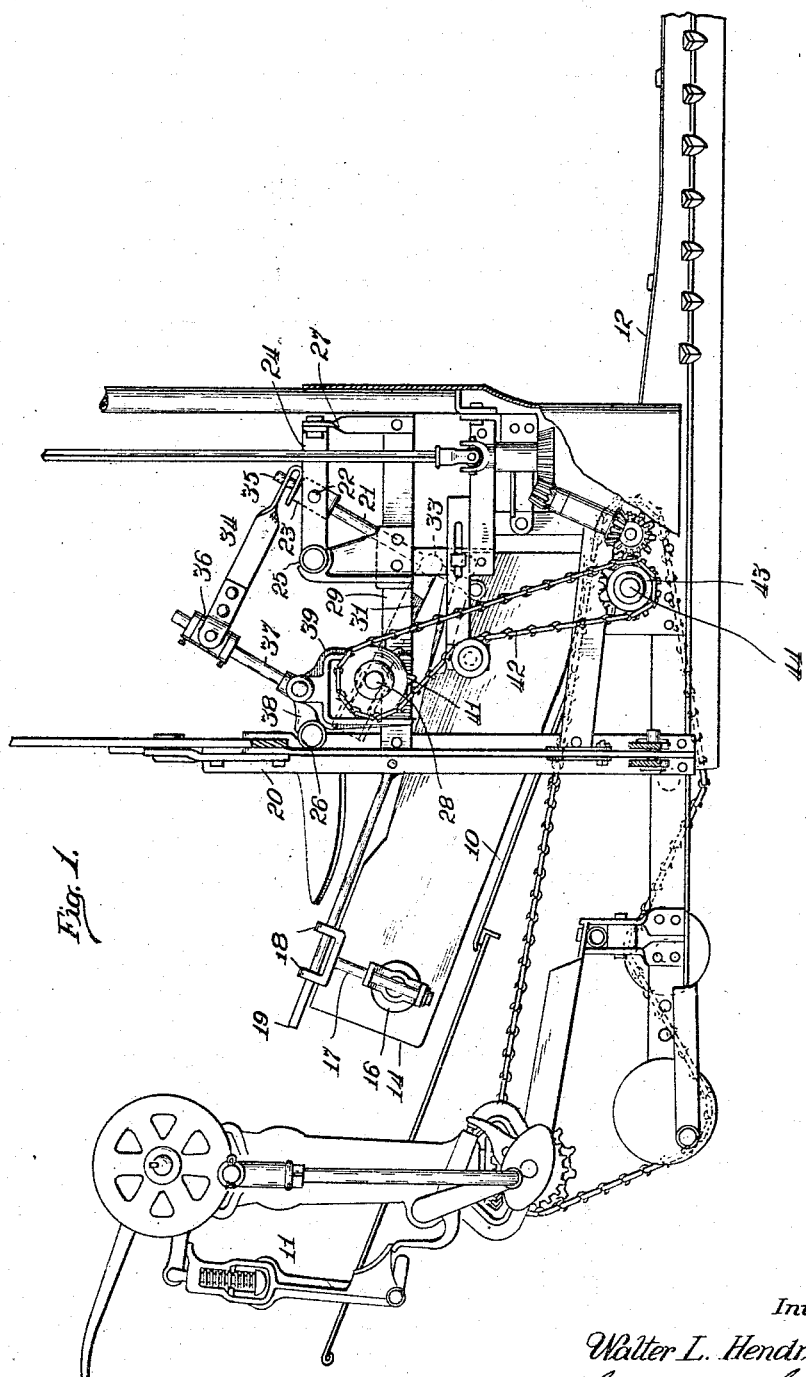
Figure 1 is a detail front elevation of a harvesting machine embodying the features of improvement provided by the invention but with some of the forward parts of the machine omitted and others shown in section.

While the drawings illustrate the use of the invention in a harvesting machine of the general type shown in Patent No. 1,177,104 issued to me March 28, 1916, the invention is not limited in its application to machines of this type. The harvesting machine illustrated comprises an inclined flat deck 10 over which the grain is moved to the bundle forming mechanism, some of the parts of which are represented at 11. While the grain is delivered to the lower edge of the deck 10 by the platform apron 12 and an intermediate feed roller 13, the conveyer mechanism for moving the grain upwardly over the deck 10 may be of any well known form and is not illustrated in the drawings. The butter board 14 operates in an upright position over the forward edge of the deck 10 for engagement with the freshly cut ends of the grain stalks. As shown, this board is provided with a series of upright ribs 15 upon the inner or rearward face.

In carrying out the invention, the butter board 14 has a swiveled sliding support at its forward end. For this purpose a bearing bracket 16 is rotatably secured against the outer face of the board and a supporting spindle 17 is rotatably mounted in the bracket 16 and extends upwardly therefrom. At its upper end the spindle 17 is bifurcated and its two arms 18 slide upon a guide rod 19. As shown, the rod 19 is firmly secured at one end against one of the upright frame members, as 20, of the machine and projects outwardly therefrom substantially parallel with the deck 10. Movement of the board 14 at its forward end is accordingly confined by the rod 19 but the board is free to swing in a horizontal direction over the deck 10. It may also tilt vertically to accommodate the movement of the parts provided for actuating the board.

As shown, an actuating rod 21 is pivotally secured against the front face of the board 14 near its lower end. This rod has both a lateral movement in a direction across the deck 10 and a swinging movement in the direction of the length of the deck. For this purpose, the upper end of the actuating rod 21 has a pivotal and sliding support upon a stationary horizontal guide rod 22. Preferably the upper end of the actuating rod 21 is formed into an elongated yoke 23 for engagement with the guide rod 22 and the two ends of this guide rod are supported in a fixed bracket 24. As shown, the bracket 24 is secured against one of two parallel longitudinal frame members 25, 26, of the machine and is also supported by an upright standard 27, (Fig. 3).

In the arrangement illustrated in the drawings, both of the movements of the actuating rod 21 are derived from a crank shaft 28 (Fig. 2). As shown, this crank shaft extends parallel with the longitudinal frame members 25, 26, and is journaled upon a pair of transverse frame members 29, 30, which are located below but are connected with the frame members 25, 26. The swinging movement is transmitted to the actuating rod 21 through a link 31 which directly connects the actuating rod with a crank 32 of the crank shaft 28. To accommodate the lateral movement of the actuating rod 21 the link 31 has a ball and socket connection 33 with the actuating rod and a loose connection with the crank 32.

Lateral movement is communicated to the actuating rod 21 through a link 34. At one end this link has a loose pivotal connection with a pin 35 which rises from the top of the yoke 23. The other end of the link 34 is connected by a universal joint 36 with a swinging arm 37. This arm is pivotally supported in a bracket 38 carried by the frame member 26 and the lower end of the arm is formed into a yoke 39 which straddles a cam 40 on the crank shaft 28 (Fig. 7). As the link 34 extends from the arm 37 to the pin 35 in a direction which is always inclined to the plane of the swinging movement of the arm 37, (Fig. 2), the swinging of the arm effects a sliding movement of the yoke 23 along the guide rod 22, and lateral movement of the actuating rod 21. Preferably the cam 40 is of such shape and is so positioned on the crank shaft 28 with reference to the crank 32 that the lateral movements of the actuating rod 21 occur when the rod is at the limits of its swinging movement. The lower end of the butter board 14 is accordingly moved in a substantially rectangular path indicated by the dot and dash line on Fig. 4. That is to say, the butter board is withdrawn from engagement with the grain by a quick outward movement, occurring at the limit of its forward movement, and it is placed into engagement with the grain by a quick inward movement occurring at the limit of its return movement. The butter board is thereby rendered effective for arranging the loose grain with the ends of the stalks in a common plane without interfering with the movement of the grain toward the bundle forming mechanism 11.

Any convenient form of driving mechanism may be employed for continuously rotating the crank shaft 28. As shown, this crank shaft is equipped with a sprocket wheel 41 at its forward end and a sprocket chain 42 turns over this sprocket wheel 41 and over a second sprocket wheel 43 which is fixed upon the forward end of a driving shaft 44 located lower down in the frame of the machine. To avoid strain upon the pivotal connection of the actuating rod 21 with the butter board 14, a guide strap 45 (Fig. 4) is secured against the outer face of the butter board and extends in front of the actuating rod.

I claim as my invention:

1. In a harvesting machine, in combination, a binder deck, an upright butter board movable over the deck at one side of the same, and actuating means for longitudinally reciprocating the board and for laterally shifting the board, the said two actuating means operating in alternation whereby the longitudinal movements of the board in the two directions are each in a substantially straight line but in different planes.

2. In a harvesting machine, in combination, a binder deck, an upright butter board movable over the deck at one side of the same, a swiveled sliding support for one end of the board, and actuating means acting upon the other end of the board for longitudinally reciprocating the board and for laterally shifting the board, the said two actuating means operating in alternation whereby the longitudinal movements of the board in the two directions are each in a substantially straight line but in different relatively inclined planes.

3. In a harvesting machine, in combination, a binder deck, an upright butter board movable over the deck at one side of the same, a guiding member extending in the direction of the length of the board adjacent one end of the same, a swiveled sliding connection between the said end of the board and the said guiding member, actuating means for longitudinally reciprocating the board and other actuating means for swinging the board upon the said swiveled connection, the said two actuating means operating in alternation whereby the longitudinal movements of the board in the two directions are each in a substantially straight line but in different relatively inclined planes.

4. In a harvesting machine, in combination, a binder deck, an upright butter board movable over the deck at one side of the same, a pair of relatively transverse guiding members, one extending in the direction of the length of the board adjacent one end of the same and the other extending across the plane of the board adjacent the other end of the same, a swiveled sliding connection between the first mentioned end of the board and the first separately mentioned guiding member, a link slidingly and pivotally mounted on the other guiding member and pivotally connected with the adjacent end of the board, actuating means for sliding the link and other actuating means for swinging the link.

5. In a harvesting machine, in combination, an upright butter board, a guide rod extending transversely over the board, a link slidingly and pivotally mounted on the guide rod and pivotally connected with the board, a crank shaft extending parallel to the said guide rod, a link connecting a crank of the said crank shaft with the first mentioned link for swinging the said first mentioned link, a cam on the said crank shaft, and means actuated by the said cam for sliding the first mentioned link along the said guide rod.

6. In a harvesting machine, in combination, an upright butter board, a guide rod extending transversely over the board, a link slidingly and pivotally mounted on the guide rod and pivotally connected with the board, a crank shaft extending parallel to the said guide rod, a link connecting a crank of the said crank shaft with the first mentioned link, a cam on the said crank shaft, a rocker arm oscillated by the cam in a plane transverse to the said guide rod and crank shaft, but at one side of the first mentioned link and another link extending obliquely between the rocker arm and the first mentioned link.

WALTER L. HENDRICKS.

Copies of this patent may be obtained for five cents each, by addressing the "Commissioner of Patents, Washington, D. C."